United States Patent Office 2,795,136
Patented June 11, 1957

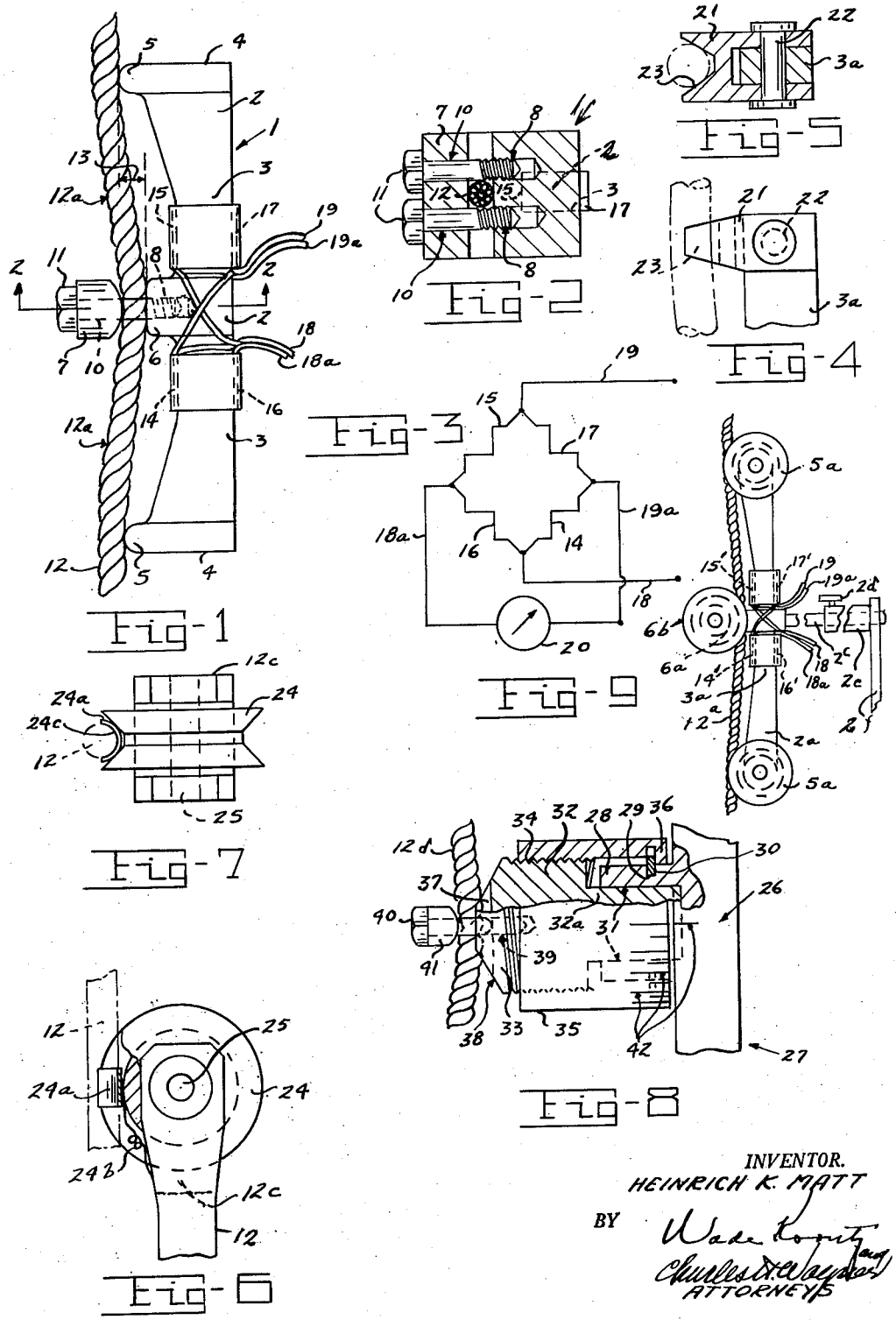

2,795,136
CABLE LOAD GAGE

Heinrich Karl Matt, Dayton, Ohio

Application August 21, 1956, Serial No. 605,456

11 Claims. (Cl. 73—144)

(Granted under Title 35, U. S. Code (1952), sec. 266)

The invention described herein may be manufactured and used by or for the United States Government for governmental purposes without payment to me of any royalty thereon.

This invention relates to measuring instruments, and more particularly to a cable load gage for measuring the tension on a stretched flexible connector such as a cable or wire, and has for an object the provision of means for electrically measuring the load or tension in a cable, wire, string, or other flexible stretched connection, and the provision for remote indication of the load applied to the cable.

A further object is the provision of an improved electrical strain gage measuring means for measuring and remotely indicating the amount of a load applied in opposite directions at spaced points on a cable, at a point between the spaced points.

Another object of the invention is the provision of electrical strain gage means for determining the tension applied to a taut cable, in which the strain gage means can be applied to and removed from the cable while it is in taut condition.

A further object is the provision of an electrical strain gage attachment suitable for accurately measuring light and heavy strain on a tensioned cable or wire member, in which the attachment can be clamped onto the cable while under tension and taken off after the completion of the measurement without interruption of the operation of the cable and the cable will not be damaged or otherwise affected by the device, and no cutting adjustment or replacement of the cable is necessary.

A further object is the provision of a strain gage device of the electrical "Wheatstone bridge circuit" type which is clamped to one side of a cable and engages the diametrically opposite side of the cable at two equally spaced adjacent points to deflect or bend the cable intermediate the adjacent spaced points while under tension, and measure the longitudinal tension on the cable tending to resist the deflection.

A further object is the provision of roller means engaging the cable at the spaced points to limit the friction and clamping contact on the cable to a single point.

A further object is the provision of grooved cable pulley at the ends and center of the bar for deflecting the cable out of a straight line to reduce all friction on the cable and including electrical strain gage means fixed on the bar for measuring the deflection of the bar by the cable to determine the tension on the cable.

A still further object is the provision of a substantially rigid or stiff resilient bar having a spaced cable abutment at each end for engagement with one side of a tensioned cable and clamping means intermediate said abutments for engaging the opposite side of said tensioned cable to deflect the cable out of a straight line toward the side engaged by the abutments, and electrical strain gage means fixed to the surface of said bar for measuring the deflection of said bar intermediate said abutments, incident to deflection of said tensioned cable by said clamping means.

A further object is the provision of a pair of electrical strain gages secured to the opposite side of the bar opposite the other two strain gages; whereby one pair of strain gages is placed under tension and the other pair is placed under compressive stress due to deflection of said bar by said cable, when the bar is clamped on a tensioned cable.

Other objects and advantages of the invention will become apparent from the following description and accompanying drawings in which like reference characters refer to like parts in the several figures of the drawings.

Drawings

Figure 1 is a somewhat diagrammatic side elevation of an electric strain gage for determining cable tension constructed in accordance with my invention.

Figure 2 is a cross sectional view taken about on the plane indicated by line 2—2 in Figure 1.

Figure 3 is a diagram view showing the wiring and bridge circuit employed.

Figures 4 and 5 are fragmentary end and transverse sectional views of the end of one of the arms of the strain gage showing a modified form of cable contact element.

Figures 6 and 7 are fragmentary side and end views showing a further modification of one of the cable contact members at the opposite ends of the strain gage bar to prevent excessive wear, friction, and distortion of the cable, and for the purpose of obtaining a better and more accurate reading when the device is placed in use.

Figure 8 is a fragmentary side view, parts being broken away and shown in section of a modified embodiment of the central cable clamp element of the strain gage bar, providing means for an adjustment in the degree deformation of the cable axis between the end cable abutment members of the strain gage.

Figure 9 is a side elevation somewhat diagrammatically illustrating a further modification, in which grooved rollers are employed for the end cable bearing or pad members as well as the central bearing or pad member, and employing a support for positioning the device on a cable against endwise movement.

Referring more particularly to Figures 1 to 3, my improved electrical strain gage is indicated generally at 1 and comprises a resilient stiff bar member 2, preferably of steel having a somewhat rectangular cross section, including a narrower central portion 3—3 where the deformation or bending of the bar is to take place. The end portions 4—4 flare outwardly and terminate in lateral cable bearing members or on pads 5—5 for engagement with a tensioned cable 12 at one side thereof.

The central portion of the bar 1 is formed with a lateral cable bearing member or abutment pad 6 against which the other side of the cable is drawn by a cap 7 engaging the opposite side of the cable to deform or bend the cable, as shown in Figure 1, the end cable bearing members or abutments pads 5—5 being higher or greater in off-set relation from the base or bar 2, provide means for deforming or bending the axis of the cable intermediate the end cable bearing members or abutments pads 5—5, as shown.

The central cable bearing member or pad 6 is formed with laterally spaced threaded sockets 8 at opposite sides of the cable 12, as shown better in Figure 2, and the cap 7 has apertures 10 at opposite sides of its center in alignment with the sockets 8 to receive the two clamping screws 11. Tightening of the clamping means or screws 11 draws the cap 7 down on the cable 12 and deforms or bends the cable intermediate the cable bearing pads 5—5 into contact with the intermediate cable bearing member or pad 6. The screws 11 can be tightened sufficiently to clamp the tensioned cable 12 to the strain gage 1 to retain the strain gage on the cable, even though the tension on the ends of the cable is relieved or removed. The deformed portion of the cable is indicated at 12ᵃ and the amount of deformation, as controlled by the cap 7 and the pad 6 is indicated at 13.

The reference numerals 14, 15 and 16, 17 indicate conventional electrical strain gage elements which are secured respectively 14 and 15 on the inside surface of the bar, or under tension when the bar is bent by the cable, while the electrical strain gage elements 16 and 17 are on the outside surface under compression. Connected in the Wheatstone bridge strain gage circuit, as seen in Figure 3, the electrical strain gages 14 and 16 are connected to one side of the Wheatstone bridge, to two arms of the circuit while the electrical strain gages 15 and 17 are connected to the other two arms of the bridge circuit. A predetermined voltage is applied to and through the strain gages 14 to 17 as shown, through input conductors 18 and 19, one terminal conductor 19 being connected between the gages 15 and 17 while the other conductor is connected intermediate the gages 14 and 16, current to a meter or strain indicator 20 such as a volt meter being supplied by circuit from the arms 15, 17 and 14, 16 of the bridge circuit and the tension or strain on the taut cable 12 is indicated on the meter 20 when a predetermined voltage is applied through the conductors 18 and 19.

In applying the device to a cable, wire, or other taut flexible conductor 12 the clamp cap 6 is first loosened and one of the screws 11 removed. This permits the cable 12 to be placed over the cable bearing member or pad 6 with the cable resting on the end cable bearing members or pads 5. The fastening or clamping screws 11 can now be replaced, thus disposing the tensioned cable 12 between the two fastening screws 11 as seen in Figure 2 with the cable in engagement with the pads 5. The clamp screws 11 are now tightened to draw the cap 7 down toward the central cable bearing member or pad 6 until the desired deformation of the cable portions 12ᵃ, as indicated at 13, is accomplished. This usually occurs when the cable 12 is clamped down against the pad 6, which also thus provides means for retaining the strain gage on the cable, even though tension on the cable is temporarily relieved. The cable engaging or clamping surface of the cap 7 is rounded, also the cable bearing or contact ends of the pads 5 are rounded, in order to prevent an abrupt bend or kink in the cable while measurement of the tension on the cable is being accomplished.

Reference being made to Figure 4 and 5, the spaced cable bearing members or contact pads, instead of having fixed and rigid rounded surfaces, tiltable cable bearing end pieces 21 may be employed which are pivoted to the ends of the strain gage arm or bar by the pivot pins 22, these pivoted cable bearing pads 21 having V notches 23 for receiving and engaging the sides of the tensioned cable 12. These can be used to better distribute the pressure of the cable at the ends of the bar 12, and compensate for stretch and deformation cable.

Referring to Figures 6 and 7, non-uniformity of the cable, due to stretch at the edges of the cable bearing points or pads can be eliminated by bifurcating the ends of the bar 12ᶜ and mounted V groove cable rollers 24 therein on pivot pins 25. In order to provide a better and longer support bearing for the tensioned cable during tests a pair of elongated transversely curved channel shaped support plates 24ᵃ may be mounted on resilient pigtails 24ᵇ fastened to the end portions of the bar 12 and riding in the V grooves of the pulleys 24 at the end of the bar 12ᶜ, with the pigtails 24ᵇ out of the path of the cable being deflected for tension measurement. The curved or cylindrical trough portions 24ᶜ of the support plates engage a material portion of the surface of the cable and should preferably have substantially the same radius as that of the cable and a curvature of substantially half of cable, reducing deformation of the cable to a minimum, especially where the cable tension is high.

The central cable bearing or pad member, instead of being rigid and non-adjustable on the center portion 3 of the resilient bar 12 may be made adjustable as shown in Figure 8 in order to adjust or control the degree of deformation 13 of the tensioned cable 12. In the modification shown in Figure 8 the central or narrower portion 26 of the bar 27 is formed with a cylindrical lateral extension 28 having an annular groove 29 therein, in which a snap ring or flange 30 is positioned. This cylindrical extension 28 is formed with a concentric guide recess or socket 31 slidably receiving a center clamp member 32 having a cable bearing head or pad 33. The exterior of the head 33 is threaded as indicated at 34 to engage the threaded interior of an adjustment sleeve 35 having a flanged inner end 36 disposed under the ring or flange 30, thus swivelly mounting the adjustment sleeve 35 on the cylindrical extension 28. The outer, or cable clamping end of the head 33 is formed with a somewhat V- or U-shaped cable groove 37, and the outer surface is beveled or somewhat conical as at 38 and formed with threaded clamping bolt receiving sockets 39 located at opposite sides of the cable groove 37. Clamping bolts 40, when passed through openings in a clamp or bar 41 and threaded into the sockets 39 and tightened, draw the cap 41 down to clamp the cable 12ᵈ in the cable groove 37 against the cable bearing member or pad, or head portion 33. This may provided resistance to rotation of head 33 when the adjustment sleeve 35 is rotated to change or adjust the distance between the pad 35 and the strain gage bar 26. This adjusts the degree of deformation of the cable (as indicated at 13 in Figure 1) as desired.

If desired the wall of the concentric guide recess 31 in the extension 28, and the stem 32ᵃ of the central clamp member 32 which slides in the recess 31 during adjustment, may be longitudinally splined together to prevent rotation of the head 33 during adjustment thereof by rotation of the thimble or sleeve 35.

If desired calibrated indicia 42 and pointer means may be employed on the adjustment thimble 35 and the bar 26 so that any preselected value or degree of deformation 13 of a cable may be selected.

Referring to Figure 9 the elongated resilient rectangular bar member is indicated at 2ᵃ, somewhat smaller in cross section at its central portion 3ᵃ and having the offset central projection or bracket 6ᵃ on which is mounted the intermediate cable bearing pad member, in the form of a grooved roller or pulley 6ᵇ, the location and arrangement of the strain gages 14', 15' and 16', 17 being the same as in Figure 1.

Grooved cable rollers or pulleys 5ᵃ are journalled at the opposite ends of the bar member 2ᵃ.

A support for the cable strain gage 2ᵃ is provided, comprising a rod 2ᶜ adjustably secured by a set screw 2ᵈ in a socket 2ᵉ on a supporting standard or bracket 2ᶠ supported or fixed in any desirable manner to a stationary member or fixture, to maintain the strain gage fixed or stationary while the tensioned cable 12ᵃ is stationary, or in motion.

While several simple embodiments of the invention have been illustrated and described, for exemplary purposes, it is understood that further modifications may be made by those skilled in the art without departing from the spirit and scope of the invention as defined in the accompanying claims.

I claim:

1. An electrical cable strain gage device comprising a resilient elongated bar member bendable intermediate its ends, laterally projecting cable bearing members at the opposite ends of said bar member disposed in offset relation to the same side of said bar member, an intermediate cable bearing member disposed on said same side of said bar member intermediate said end cable bearing members in offset relation to said bar member at a lesser offset relation than said end members, cable clamp means connected to said intermediate cable bearing member for drawing a tensioned cable in contact with said end bearing members toward said bar member intermediate said end bearing member to proportionally bend said resilient elongated bar member intermediate said end bearing members, electric strain gage members fixed to the surface of said bar member adjacent the sides of said intermediate cable bearing member, and on the same side of said bar member as said end and intermediate cable bearing members, and electrical conductors connecting said strain gage members.

2. An electrical strain gage device as set forth in claim 1 including electrical strain gage members fixed to said bar member adjacent said intermediate cable bearing member on the side of said bar member opposite the side having the intermediate and end cable bearing members thereon, whereby bending of said bar member under tension of a cable disposed on said end bearing members and drawn toward said intermediate cable bearing member will place said strain gage member on the intermediate cable bearing member containing side of the bar member under tension and place the strain gage members fixed on the opposite side of the bar member under compression, and electrical conductors connecting said strain gage members on the last mentioned opposite side, whereby upon connection of said conductors to opposite side of a Wheatstone bridge circuit with the strain gage member in one side of the bridge connected to one branch of the bridge circuit and the other strain gage member connected in the other side of the bridge, the effective output of the strain gage members in the bridge circuit is additive upon bending of the bar member.

3. An electrical strain gage device comprising an elongated resilient bar member bendable intermediate its ends, upon application of force laterally to said bar member in a common plane, in opposite directions to both ends and to the intermediate portion of said bar member, laterally projecting cable end bearing members in said plane at opposite ends of said bar member, an intermediate cable bearing member disposed in said plane on the same side of said bar member intermediate said cable end bearing members, in offset relation to said bar member, means on said intermediate cable bearing member for drawing a tensioned cable in contact with both of said cable end bearing members toward said bar member to bend said cable and proportionally bend said resilient elongated bar member intermediate cable end bearing members, electric strain gage member fixed to the surface of said bar member adjacent the sides of said intermediate cable bearing member, perpendicular to said plane, and electrical conductors for connecting said strain gage member in a Wheatstone bridge circuit.

4. An electrical strain gage comprising a substantially rectangular in cross section stiff resilient bar member, reduced in cross sectional area substantially midway between its ends to increase its bendability in one plane between said ends, cable engaging members projecting laterally in said plane from the opposite end portions and same side of said bar member, an intermediate cable engaging member extending in said plane from the same side of said bar member, substantially midway between said end cable engaging members and having a cable engaging portion disposed a predetermined shorter distance from said bar member than the end cable engaging members for engaging the opposite side of a cable from the side of the cable engaged by the cable end engaging means to bend tensioned cable disposed in said plane in engagement on one side with both of said end cable engaging means toward the midportion of said bar member, an electrical strain gage means fixed to the surface of the side of said bar member having said cable engaging members projecting therefrom and disposed adjacent said midportion thereof, a second electrical strain gage means fixed to the opposite side of said bar member substantially opposite the first mentioned strain gage means, both of said strain gage means being located in said reduced cross sectional area portion of said bar to be correspondingly placed under tension and compression, upon bending of said bar member when a tensioned cable is disposed in said plane in contact with said end cable engaging means and displaced toward said reduced cross sectional area of said bar by said intermediate cable engaging members by engagement therewith, a Wheatstone bridge circuit including an indicator therefor, one of said strain gage means on one side of said bar member being connected in one branch of said bridge circuit and the other of said strain gage means on the opposite side of said bar disposed on the other branch of said bridge circuit, whereby the bending of said bar member under tension of said cable places one of the strain gage pads under tension and the other strain gage member under compression and the resistance of said strain gages in said bridge circuit are additive.

5. An electrical strain gage comprising a substantially rectangular stiff resilient bar member, reduced in cross sectional area substantially centrally between its ends to increase its bendability in one plane between said ends, cable pad members projecting laterally in said plane from the opposite end portions and same surface of said bar member, an intermediate cable bearing pad extending in said plane from the same side of said bar member substantially midway between said end cable bearing pad member, said intermediate cable bearing pad being disposed a predetermined shorter distance from the bar member than the end bearing pad members, a cable clamp and means for drawing said cable clamp toward said intermediate cable bearing pad to bend a tensioned cable disposed in said plane, in engagement with both of said end bearing pad members, toward said bar member, a pair of electrical strain gage pads fixed to the surface of the side of said bar member having the cable bearing pad members thereon, disposed closely adjacent each side of said intermediate cable bearing pad, a second pair of electrical strain gage pads fixed to the opposite side of the bar member substantially opposite the first pair of strain gage pads, said pads being located in said reduced cross sectional area portion of said bar member to be correspondingly placed under tension and compression upon bending of said bar member when a tensioned cable is disposed on said end pads and displaced toward said intermediate cable bearing pad member by said cable clamp, a Wheatstone bridge circuit including a voltage variation indicator, said strain gage pads on one side of said bar member being connected in one side of said bridge circuit and the other pair of said pads connected in the other side of said bridge circuit, whereby the bending of said bar member under tension of said cable places one pair of said strain gages under tension and correspondingly places the other pair of strain gages under compression to produce an additive effect of said strain gages in said Wheatstone bridge circuit.

6. An electrical strain gage device comprising an elongated substantially rectangular stiff resilient bar member having cable engaging end pulley means at its opposite ends for engagement with one side tensioned cable at predetermined spaced points in offset relation to one side of said bar member, a pulley bracket member projecting laterally from the same side of said bar member substantially midway between said end pulley means at the ends of the bar member, central pulley means journalled in said pulley bracket member in greater predetermined offset relation from said same side of said bar member than said cable engaging end pulley means to engage the opposite side of said tensioned cable to bend said cable intermediate said end pulley means in a direction toward said bar member and proportionally bend said bar member in the opposite direction, a pair of electrical strain gage members fixed to the opposite sides of said bar member adjacent said midway portion, one of said strain gages facing toward said central pulley means to be placed under tension by bending of said bar member and the other facing away from said central pulley means to be placed under compression by said bending of said bar member.

7. An electrical strain gage device comprising an elongated stiff resilient bar member bendable intermediate its ends, spaced cable engaging means at the opposite ends of said bar member for engaging the same side of a tensioned cable, central cable engaging means projecting laterally from said bar member having a cable engaging portion disposed at a predetermined shorter distance from said bar member than the cable engaging portions of said spaced cable engaging means for engaging the opposite side of the tensioned cable to bend the tensioned cable intermediate said spaced cable engaging means toward said bar member, strain gage means fixed to the opposite sides of said bar adjacent said central cable engaging means, to be placed under compression and tension upon bending of said bar member by said cable, and a Wheatstone bridge circuit having one of said strain gage means connected in one branch thereof and the other strain gage means connected in the other branch thereof.

8. Apparatus as claimed in claim 7 in which said spaced cable engaging means comprises grooved pulleys, and said central cable engaging means comprises a cable abutment and clamp means for securing said cable against said abutment.

9. Apparatus as claimed in claim 7 including adjustable means for varying the offset cable engaging relation between said spaced and intermediate cable engaging means.

10. Apparatus as claimed in claim 7 in which said spaced cable engaging means comprise pulleys journalled at the opposite ends of said bar member having grooved peripheries to receive said cable.

11. Apparatus as claimed in claim 10 including grooved cable supporting block members flexibly secured to said bar member and riding in the grooved peripheries of the pulleys, said block members having cable grooves formed therein and facing outwardly of said pulleys to receive and support the cable therein in spaced relation to said pulley, said cable grooves having a radius substantially equal to the radius of the cable to reduce transverse deformation of the tensioned cable during the bending thereto.

References Cited in the file of this patent

UNITED STATES PATENTS

| | | |
|---|---|---|
| 1,722,036 | Byl | July 23, 1929 |
| 2,362,626 | Griffen | Nov. 14, 1944 |
| 2,597,751 | Ruge | May 20, 1952 |
| 2,743,606 | Webber | May 1, 1956 |